US009175740B2

(12) United States Patent
Cultraro

(10) Patent No.: US 9,175,740 B2
(45) Date of Patent: Nov. 3, 2015

(54) LINEAR SHOCK ABSORBER HAVING A COMPENSATION DIAPHRAGM WITH INTEGRAL SEALS

(75) Inventor: Antonino Cultraro, Rivoli (IT)

(73) Assignee: CULTRARO AUTOMAZIONE ENGINEERING S.R.L. (IT)

( * ) Notice: Subject to any disclaimer, the term of this patent is extended or adjusted under 35 U.S.C. 154(b) by 235 days.

(21) Appl. No.: 13/880,645

(22) PCT Filed: Oct. 19, 2011

(86) PCT No.: PCT/IB2011/054651
§ 371 (c)(1),
(2), (4) Date: Apr. 19, 2013

(87) PCT Pub. No.: WO2012/052934
PCT Pub. Date: Apr. 26, 2012

(65) Prior Publication Data
US 2013/0206522 A1 Aug. 15, 2013

(30) Foreign Application Priority Data
Oct. 19, 2010 (IT) .............. TO2010A0845

(51) Int. Cl.
F16F 9/06 (2006.01)
F16F 9/088 (2006.01)
F16F 9/36 (2006.01)

(52) U.S. Cl.
CPC .............. *F16F 9/088* (2013.01); *F16F 9/064* (2013.01); *F16F 9/361* (2013.01)

(58) Field of Classification Search
CPC .................................. F16F 9/088; F16F 9/06

USPC ......................................................... 188/269
See application file for complete search history.

(56) References Cited

U.S. PATENT DOCUMENTS

| 2,308,404 | A | * | 1/1943 | Thornhill ................... 267/64.19 |
| 3,121,479 | A | * | 2/1964 | Diilenburger et al. ........ 188/269 |
| 3,391,920 | A | * | 7/1968 | Schmid ....................... 267/64.16 |

(Continued)

FOREIGN PATENT DOCUMENTS

| EP | 0150104 | 7/1985 | ............... F16F 9/08 |
| NL | 121975 | 3/1967 | ............... F16F 9/18 |

OTHER PUBLICATIONS

International Search Report and Written Opinion issued in corresponding appln. No. PCT/IB2011/054651, dated Nov. 30, 2011 (7 pgs).

*Primary Examiner* — Robert A Siconolfi
*Assistant Examiner* — James Hsiao
(74) *Attorney, Agent, or Firm* — Hayes Soloway P.C.

(57) ABSTRACT

A shock absorber has a tubular housing, a bearing sealingly mounted to the front end of the tubular housing, a piston mounted within the tubular housing for a reciprocal sliding movement, which defines within the tubular housing a working chamber and an accumulator chamber. A stem is connected to the piston and projects from the tubular housing through the bearing. At least one fluid pathway connects the working chamber to the accumulator chamber. A compensation diaphragm facing on the accumulator chamber includes a sleeve made of a deformable material mounted between the ends of the bearing. The compensation diaphragm has a rear end folded backwards such as to envelope the cup-shaped rear end of the bearing, and is provided with a shaped edge to provide a sealing between the bearing and the piston stem.

20 Claims, 3 Drawing Sheets

(56) References Cited

U.S. PATENT DOCUMENTS

| | | | |
|---|---|---|---|
| 3,410,416 A * | 11/1968 | Peterson | 213/43 |
| 3,469,661 A * | 9/1969 | Lohr et al. | 188/269 |
| 3,625,321 A * | 12/1971 | Lutz | 188/298 |
| 3,944,197 A * | 3/1976 | Dachicourt | 267/64.23 |
| 4,096,927 A * | 6/1978 | Takatsu | 188/268 |
| 4,132,395 A * | 1/1979 | Fox, Jr. | 267/64.23 |
| 4,206,908 A * | 6/1980 | Mercier | 267/64.23 |
| 4,700,815 A * | 10/1987 | Persicke et al. | 188/286 |
| 4,828,231 A * | 5/1989 | Fukumura et al. | 267/64.23 |
| 4,880,213 A * | 11/1989 | Shinbori et al. | 267/64.27 |
| 4,890,822 A * | 1/1990 | Ezure et al. | 267/64.23 |
| 5,098,071 A * | 3/1992 | Umetsu | 267/64.27 |
| 5,826,862 A * | 10/1998 | Beck | 267/64.17 |
| 2006/0163016 A1 | 7/2006 | Ferkany | 188/288 |
| 2010/0219569 A1* | 9/2010 | Mori | 267/127 |
| 2012/0248666 A1* | 10/2012 | DeBruler et al. | 267/64.24 |

* cited by examiner

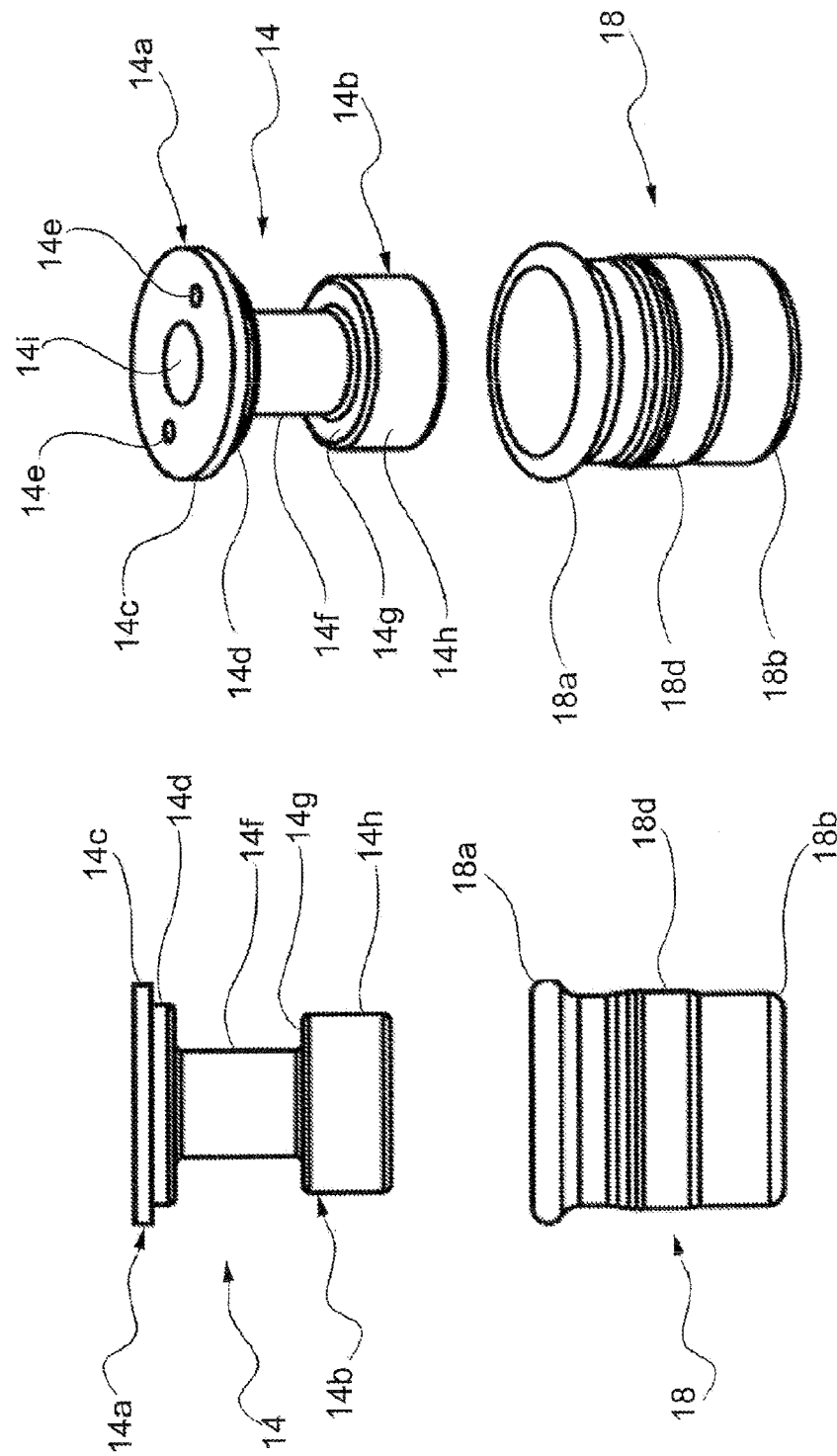

LINEAR SHOCK ABSORBER HAVING A COMPENSATION DIAPHRAGM WITH INTEGRAL SEALS

BACKGROUND OF THE INVENTION

The present invention relates to a shock absorber, comprising:
- a tubular housing having a front end and a rear end;
- a bearing sealingly mounted on the front end of the tubular housing, said bearing being constituted by a bush having a flanged front end which closes the tubular housing and a cup-shaped rear end which is disposed within the tubular housing;
- a piston assembly comprising a piston mounted for reciprocal sliding movement in the tubular housing, said piston defining within the tubular housing a working chamber and an accumulator chamber disposed on the rear side and on the front side of the piston, respectively, and a stem connected to the piston and extending out of the front end of the tubular housing through the bearing;
- at least one fluid pathway for connecting the working chamber to the accumulator chamber; and
- a compensation diaphragm facing on the accumulator chamber, which is constituted by a sleeve of deformable material mounted between the ends of the bearing.

A shock absorber of this type is known for example from US 2006/163016 A1.

SUMMARY OF THE INVENTION

The object of the present invention is to provide a shock absorber having a compact size, which can be manufactured using a small number of components.

This object is achieved according to the invention by means of a shock absorber as defined above in the preamble, wherein said compensation diaphragm has a rear end folded backwards such as to envelop the cup-shaped rear end of the bearing, and provided with an edge shaped for making a seal between the bearing and the stem of the piston assembly.

BRIEF DESCRIPTION OF THE DRAWINGS

Further characteristics and advantages of the device according to the invention will be more clearly understood with the following detailed description of an embodiment of the invention, made with reference to the annexed drawings, which are provided by way of non-limiting examples, in which:

FIGS. 3 and 4 are side elevation and perspective exploded views, respectively, of a bearing and a compensation diaphragm of the shock absorber in FIG. 1.

DETAILED DESCRIPTION OF THE INVENTION

Figure 1:
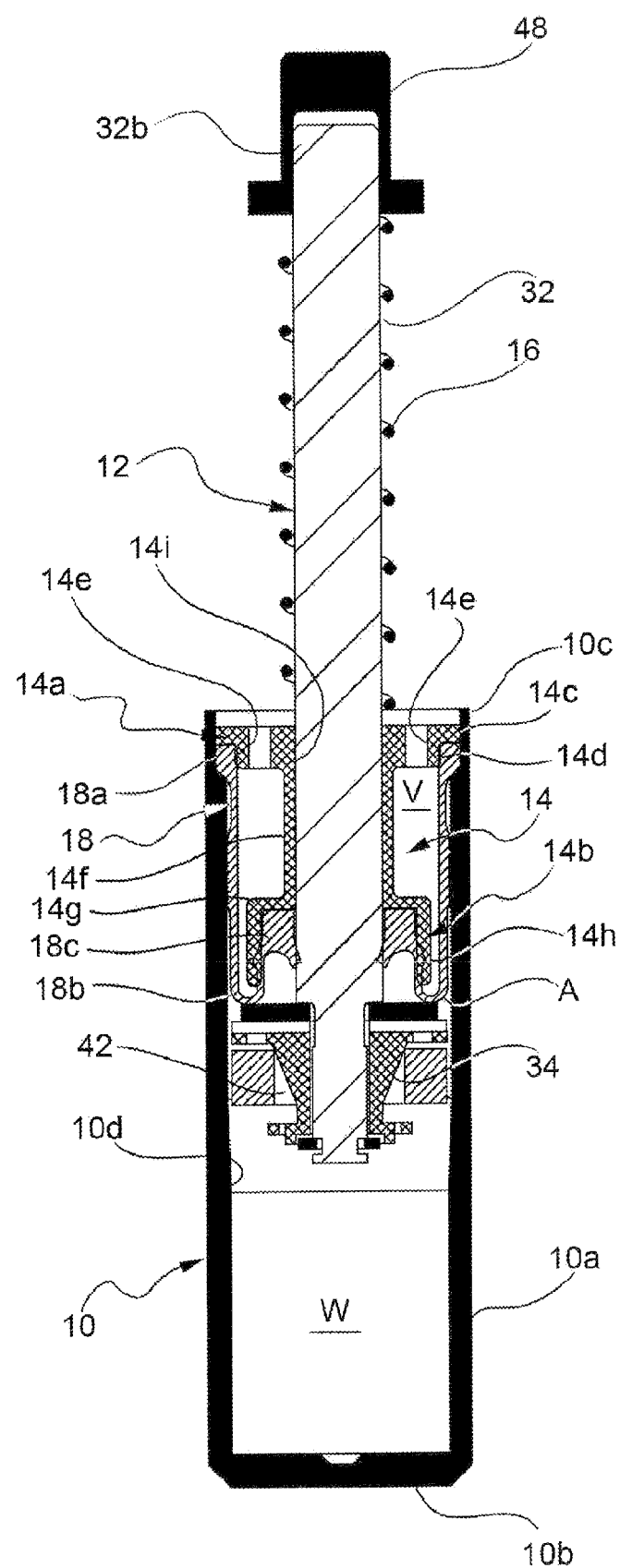
FIG. 1 is a longitudinal sectional view of a linear shock absorber according to the invention.
Figure 2:
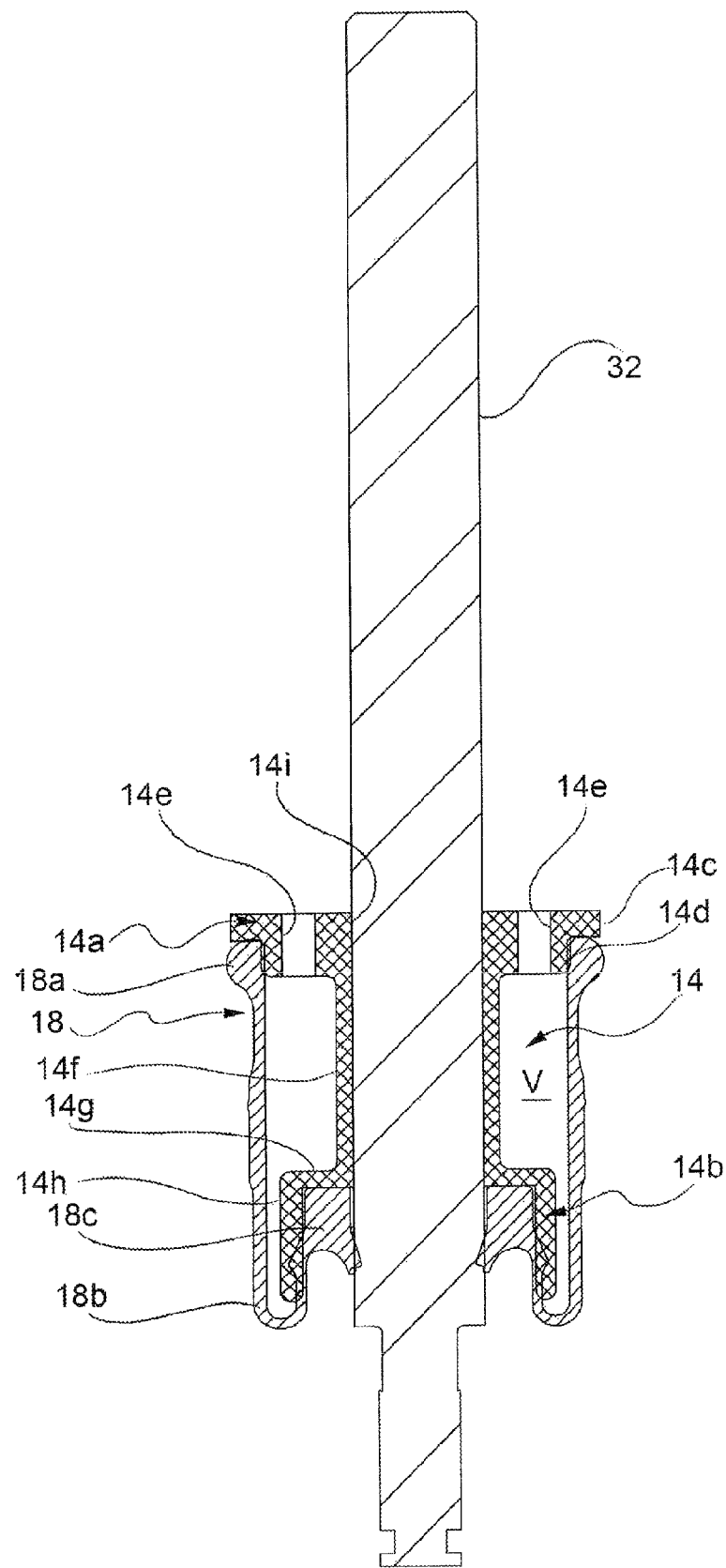
FIG. 2 is a longitudinal sectional view of a part of the components of the shock absorber in FIG. 1.

With reference to FIGS. 1 and 2, a shock absorber according to the invention comprises a tubular housing 10, a piston assembly 12, a bearing/plug 14, a return spring 16, and a compensation diaphragm 18.

The tubular housing 10 comprises a portion of main tubular housing 10a and a portion of rear end wall 10b at the housing rear end. The terms "front" and "rear" herein are meant in the longitudinal direction of the shock absorber, and are used with reference to the end of the shock absorber in which the piston stem has been inserted.

The portion of main tubular housing 10a has a front end 10c constituted by a collar portion, having a wall thickness lower than the wall thickness of the part adjacent the portion of tubular housing 10a. The main portion of the tubular housing 10a defines a cavity 10d therein.

The bearing 14 is sealingly mounted to the front end 10c of the tubular housing 10, and consists of a bush having a flanged front end 14a, which closes the tubular housing, and a cup-shaped rear end 14b, disposed within the tubular housing.

More particularly, the front end 14a comprises an outer annular portion 14c, having an outer diameter corresponding to the diameter of the cavity 10d of the housing 10 at the front end 10c thereof, and an inner annular portion 14d having a lower diameter than the outer annular portion 14c. Through the flanged front end 14a at least one through hole 14e is provided.

The rear end 14b of the bearing 14, which is integrally connected to the front end 14a through a shaft portion 14f having a lower diameter than the front and rear ends 14a, 14b, preferably has a highest outer diameter lower than the inner diameter of the cavity 10d of the tubular housing 10. As mentioned above, the upper end 14b of the bearing 14 is cup-shaped; particularly, it comprises a bottom portion 14g, which is directly connected to the shaft portion 14f, and a collar portion 14h projecting from the bottom portion 14g to the rear end 10b of the tubular housing 10.

The bearing 14 has a central passageway 14i for the piston stem to project outwards; the sealing at this passageway is ensured as detailed below.

The front end 14a of the bearing 14 is fixed to the front end 10c of the tubular housing 10 at the collar, portion thereof, by means of a back folding of the collar portion (this back folding is not illustrated). The closing mode of the tubular housing 10 is, however, not essential for the purpose of the invention.

The piston assembly 12 comprises a stem 32 and a piston 34. The piston 34 is mounted within the tubular housing 10 for a reciprocal sliding movement, and defines a working chamber W and an accumulator chamber A within the tubular housing 10, which are disposed from the rear side of the piston 34, i.e. between the piston 34 and the end wall 10b of the tubular housing 10, and from the front side of the piston 34, i.e. between the piston 34 and the bearing 14, respectively; these chambers are filled with a viscous fluid, for example silicone oil, which during the operation of the shock absorber flows from the one chamber to the other one in a conventional manner known per sc, which is anyway not essential for the purpose of the present invention. The stem 32 is connected to the piston 34 and protrudes from the front end 10c of the tubular housing 10 through the bearing 14.

The specific structure and the operating manner of the stem 32 and piston 34 are not essential for the purpose of the invention, and therefore they will not be described herein. Conventionally, there is at least one fluid pathway 42 being provided through the piston and/or the stem and/or between the piston and the stem and/or between the piston and the wall of the tubular housing to connect the working chamber W to the accumulator chamber A.

Similarly conventionally, a valve 44 can be provided to modulate the resistance to the fluid flowing from the one chamber to the other, and accordingly the resistance provided by the shock absorber during operation.

The return spring 16 is a helical spring, the front end thereof contacting a tip 48, which is mounted to the front end 32h of the stem 32, and the rear end thereof contacts the bearing/lid 14, such as to normally bias the piston assembly 12 in the extended direction of the shock absorber. The maximum extended, or rest position, of the piston assembly 12 is illustrated in FIG. 1. In this position, the viscous fluid is completely (or almost completely) within the working chamber W.

The compensation diaphragm 18 is disposed facing on the accumulator chamber A, and consists of a sleeve made of a deformable material, which is mounted between the ends 14a, 14b of the bearing 14. The compensation diaphragm 18 is elastically deformed when the fluid flows through the working chamber W and the accumulator chamber A in order to compensate for the volume changes of the working chamber which occur during the movements of the piston 34.

More particularly, the compensation diaphragm 18 has a front end 18a constituted by a thickened rim, which in the assembled condition of the shock absorber is radially positioned (particularly, compressed) between the inner portion 14d of the front end 14a of the bearing 14 and the collar portion 10c of the tubular housing 10, and axially between the outer portion 14c of the front end 14a of the bearing 14 and a shoulder of the tubular housing 10 adjacent to the collar portion 10c. Thereby, the front end 14a of the compensation diaphragm 18 acts as a seal to provide a sealing between the bearing 14 and the tubular housing 10.

The compensation diaphragm 18 then comprises a rear end 18b which is folded backwards such as to envelope the cup-shaped rear end 14b of the bearing 14, by wrapping around the collar portion 14h, and is provided with a shaped edge 18c to provide a sealing between the bearing 14 and the stem 32 of the piston assembly 12. Particularly, the edge 18c of the rear end 18b of the compensation diaphragm 18 forms a lip-shaped annular seal and is accomodated within the cup-shaped rear end 14b of the bearing 14. Preferably, the edge 18c of the rear end 18b of the compensation diaphragm 18 has respective lips on the bearing 14 side and on the stem 32 side of the piston assembly 12.

Practically, the compensation chamber A is disposed such as to surround the compensation diaphragm 18, and accordingly a space V is defined, which is interposed between the compensation diaphragm 18 and the bearing 14, which space is in fluid communication with the outside of the shock absorber through the through-holes 14e provided on the flanged front end 14a of the bearing. As the fluid rises within the accumulator chamber A, it flows to the annular gap between the rear end 18b of the compensation diaphragm 18 and the wall of the tubular housing 10, by pressing from the radially outer side the diaphragm 18 against the collar portion of the cup-shaped rear end 14h of the bearing 14, and flows to the space around the compensation diaphragm, flush with the shaft portion 14f of the bearing. The diaphragm 18 is then radially compressed thereby narrowing the space V, due to the fact that the air provided within this space is vented to the outside through the through-holes 14e.

The compensation diaphragm 18 is made from a material which is capable of ensuring an elastic recovery of the shape thereof, when the fluid is forced to flow out of the accumulator chamber A, thereby causing the diaphragm to return to the condition illustrated in FIG. 1. In order to facilitate this elastic recovery of the shape thereof, the compensation diaphragm preferably has a belt 18d of increased thickness at the level of said space V.

The invention claimed is:

1. A shock absorber, comprising:
   a tubular housing having a front end and a rear end;
   a bearing sealingly mounted on the front end of the tubular housing, said bearing being formed by a bush having a flanged front end which closes the tubular housing and a cup-shaped rear end which is arranged within the tubular housing, said rear end of the bearing comprising a bottom portion radially extending from the bearing, and a collar portion axially protecting from the bottom portion;
   a piston assembly comprising a piston mounted for reciprocal sliding movement in the tubular housing, said piston defining within the tubular housing a working chamber and an accumulator chamber disposed on the rear side and on the front side of the piston, respectively, and a stem connected to the piston and extending out of the front end of the tubular housing through the bearing;
   at least one fluid pathway connecting the working chamber to the accumulator chamber; and
   a compensation diaphragm facing on the accumulator chamber, which is formed by a sleeve of deformable material mounted between the ends of the bearing;
   wherein the compensation diaphragm has a rear end folded backwards to envelop the cup-shaped portion of the rear end of the bearing, and provided with an edge forming a seal between the bearing and the stem of the piston assembly.

2. A shock absorber according to claim 1, wherein said rear end of the bearing has a maximum outer diameter smaller than the inner diameter of the cavity of the tubular housing.

3. A shock absorber according to claim 1, wherein said accumulator chamber is arranged around the compensation diaphragm, a space being provided interposed between the compensation diaphragm and the bearing, and being in fluid communication with the outside of the shock absorber.

4. A shock absorber according to claim 3, wherein at least one through bore is formed on said flanged front end of the bearing for allowing said space to fluidly communicate with the outside of the shock absorber.

5. A shock absorber according to claim 3, wherein said compensation diaphragm has a belt of increased thickness at the level of said space.

6. A shock absorber according to claim 1, wherein the edge of the rear end of the compensation diaphragm forms an annular lip seal and is housed within the collar portion of the rear end of the bearing.

7. A shock absorber according to claim 6, wherein the edge of the rear end of the compensation diaphragm has lips on the bearing side and on the piston assembly stem side, respectively.

8. A shock absorber according to claim 2, wherein said accumulator chamber is arranged around the compensation diaphragm, a space being provided interposed between the compensation diaphragm and the bearing, and being in fluid communication with the outside of the shock absorber.

9. A shock absorber according to claim 8, wherein at least one through bore is formed on said flanged front end of the bearing for allowing said space to fluidly communicate with the outside of the shock absorber.

10. A shock absorber according to claim 4, wherein said compensation diaphragm has a belt of increased thickness at the level of said space.

11. A shock absorber according to claim 8, wherein said compensation diaphragm has a belt of increased thickness at the level of said space.

12. A shock absorber according to claim 9, wherein said compensation diaphragm has a belt of increased thickness at the level of said space.

13. A shock absorber according to claim 2, wherein the edge of the rear end of the compensation diaphragm forms an annular lip seal and is housed within the collar portion of the rear end of the bearing.

14. A shock absorber according to claim 3, wherein the edge of the rear end of the compensation diaphragm forms an annular lip seal and is housed within the collar portion of the rear end of the bearing.

15. A shock absorber according to claim 4, wherein the edge of the rear end of the compensation diaphragm forms an annular lip seal and is housed within the collar portion of the rear end of the bearing.

16. A shock absorber according to claim 5, wherein the edge of the rear end of the compensation diaphragm forms an annular lip seal and is housed within the collar portion of the rear end of the bearing.

17. A shock absorber according to claim 13, wherein the edge of the rear end of the compensation diaphragm has lips on the bearing side and on the piston assembly stem side, respectively.

18. A shock absorber according to claim 14, wherein the edge of the rear end of the compensation diaphragm has lips on the bearing side and on the piston assembly stem side, respectively.

19. A shock absorber according to claim 15, wherein the edge of the rear end of the compensation diaphragm has lips on the bearing side and on the piston assembly stem side, respectively.

20. A shock absorber according to claim 16, wherein the edge of the rear end of the compensation diaphragm has lips on the bearing side and on the piston assembly stem side, respectively.

\* \* \* \* \*